United States Patent
Staebler et al.

(10) Patent No.: US 7,219,587 B1
(45) Date of Patent: May 22, 2007

(54) HAND-GUIDED JIG SAW MACHINE

(75) Inventors: Manfred-Otto Staebler, deceased, late of Waldenbuch (DE); by Monika Staebler, legal representative, Waldenbuch (DE); Alfred Frech, Leinfelden-Echterdingen (DE); Juergen Wiker, Leinfelden-Echterdingen (DE); Uwe Engelfried, Ostfildern (DE); Siegried Keusch, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,007
(22) PCT Filed: May 26, 2000
(86) PCT No.: PCT/DE00/01720

§ 371 (c)(1),
(2), (4) Date: Mar. 15, 2001

(87) PCT Pub. No.: WO00/74907

PCT Pub. Date: Dec. 14, 2000

(30) Foreign Application Priority Data

Jun. 5, 1999 (DE) ................................ 199 25 750

(51) Int. Cl.
*B27B 19/12* (2006.01)
(52) U.S. Cl. .............................. 83/783; 83/746; 83/752; 30/392
(58) Field of Classification Search .................. 83/571, 83/698.4, 699.21, 746, 752, 781, 783, 784; 30/392, 509
See application file for complete search history.

(56) References Cited

U.S. PATENT DOCUMENTS

| 1,826,983 A | * | 10/1931 | Beebe | 83/777 |
| 2,233,862 A | | 3/1941 | Dremel | 83/752 |
| 2,753,898 A | * | 7/1956 | Macfarland | 30/393 |
| 4,603,614 A | * | 8/1986 | Charonnat | 83/752 |
| 4,841,823 A | * | 6/1989 | Brundage | 83/781 |
| 5,027,518 A | | 7/1991 | Adomatis | 30/392 |
| 5,176,059 A | | 1/1993 | Anderson | 83/462 |
| 5,351,590 A | | 10/1994 | Everts | 83/699.21 |
| 5,870,829 A | | 2/1999 | Gugel | 30/392 |
| 6,467,176 B1 | * | 10/2002 | Frech et al. | 30/392 |
| 6,474,211 B1 | * | 11/2002 | Lin | 83/783 |
| 6,658,979 B1 | * | 12/2003 | Frech et al. | 83/746 |

FOREIGN PATENT DOCUMENTS

CH 200 742 10/1938

* cited by examiner

*Primary Examiner*—Hwei-Siu C. Payer
(74) *Attorney, Agent, or Firm*—Michael J. Striker

(57) ABSTRACT

A hand-guided power jigsaw (10) with a jigsaw blade (33) which can be detachably clamped between the free ends of two essentially parallel arms (122, 222) preferably comprised of a U-shaped frame (22), in particular comprised of a tube, and which can be driven, in particular in a reciprocating manner, by a motor (11) integrated into the jigsaw (10), wherein a laterally protruding handle (13) with a switch button (15) of an on/off switch is disposed at the free end of one of the arms (221, 222), can be manufactured as lightweight, compact, and inexpensive because the lower arm (122) carries the motor (11) and transmission mechanism (114, 115, 116, 119, 67) for moving the saw blade (33) back and forth, particularly in a base housing (12), wherein a motor shaft (1103) with a crankshaft (116) is coupled parallel to the arm (221) and is coupled by means of a connecting rod (67) to an elastic support (51, 57) in order to clamp the jigsaw blade (33) in place.

14 Claims, 9 Drawing Sheets

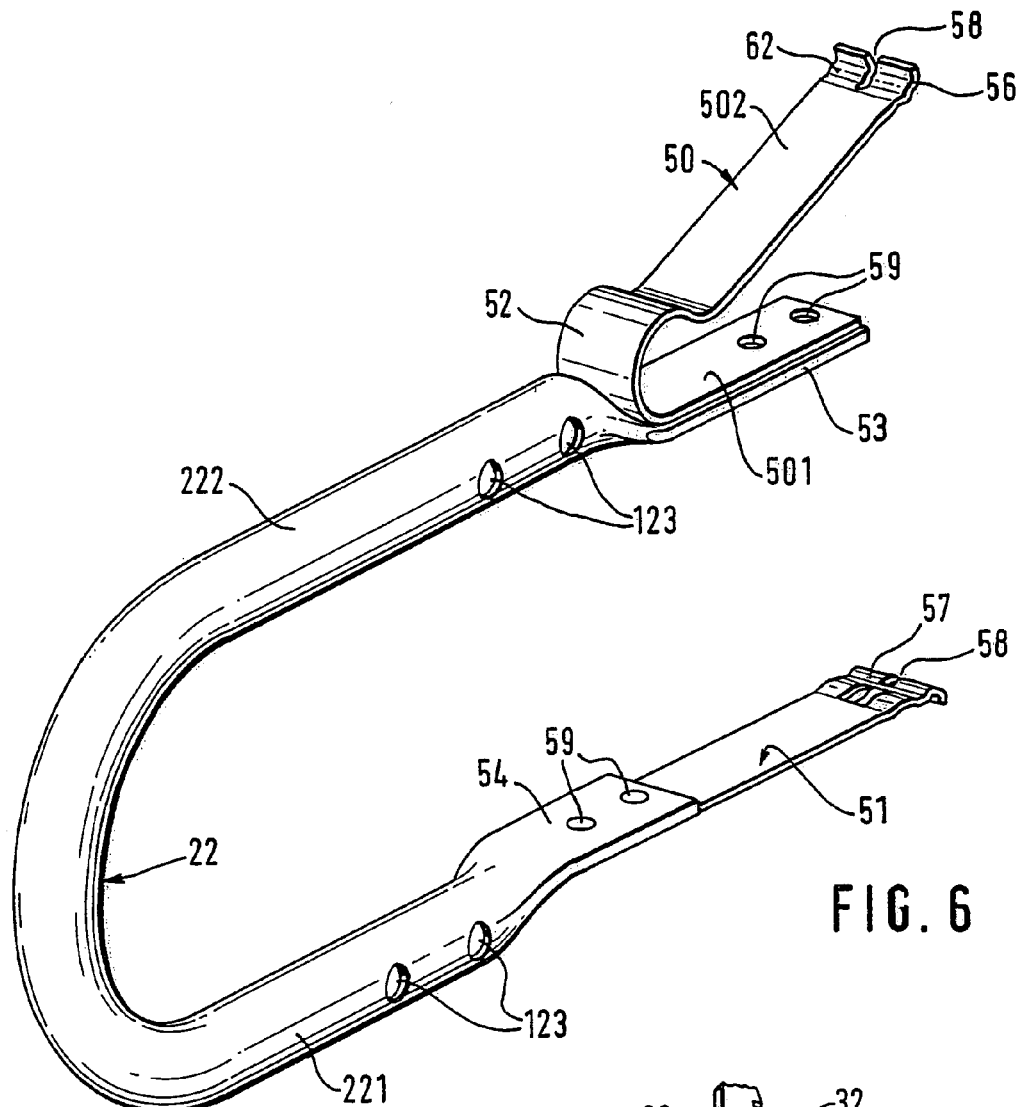
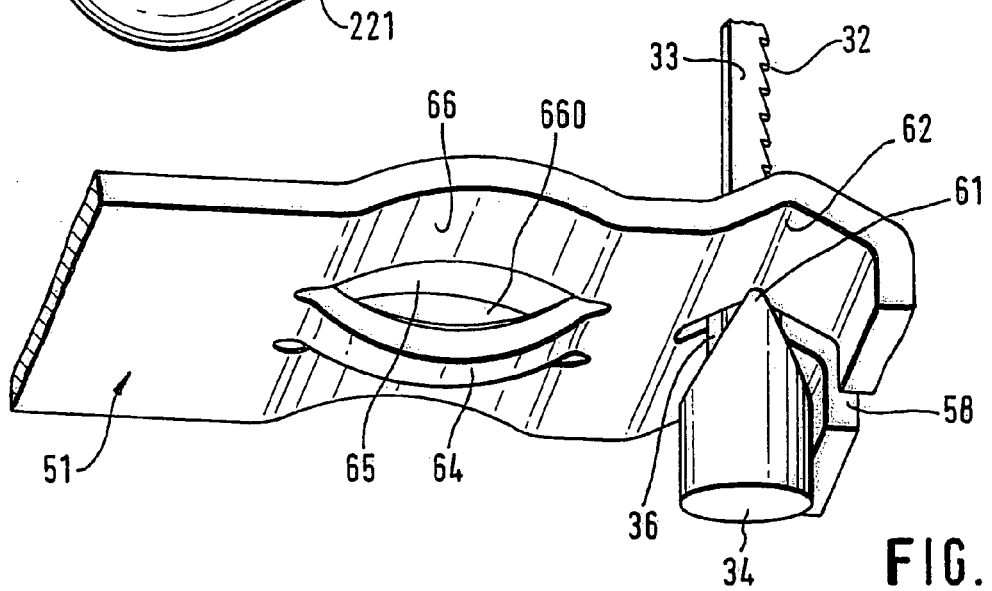
FIG. 6
FIG. 7

HAND-GUIDED JIG SAW MACHINE

CROSS-REFERENCE

The invention described and claimed hereinbelow is also described in DE 199 25 750.7, filed Jun. 5, 1999. This German Patent Application, whose subject matter is incorporated here by reference, provides the basis for a claim of priority of invention under 35 U.S.C. 119 (a)–(d).

BACKGROUND OF THE INVENTION

The current invention is based on a hand-guided power jigsaw.

U.S. Pat. No. 5,027,518 has disclosed a power jigsaw of this generic type, which is similar to a hand-actuated jigsaw. The typically U-shaped frame has a handle protruding laterally downward and a motor housing, wherein the back of the handle has a switch button for controlling the energy supply of the motor.

A jigsaw blade is clamped between the parallel arms embodied by the frame and can be driven to oscillate by means of a battery operated motor disposed on the lower arm. In comparison to manual jigsaws, the known machine has the advantage that it is no longer necessary to execute the sawing motion by hand, but the placement of the motor lateral to the arm axis makes the power jigsaw unwieldy and blocks visibility in the vicinity of the tool contact. In addition, the transmission and guide mechanisms disposed between the jigsaw blade and the motor are relatively costly.

SUMMARY OF THE INVENTION

The hand-guided power jigsaw has the advantage that it is has a particularly lightweight and rugged drive and motion transmission system for the up-and-down motion of the jigsaw blade, is very lightweight, rests comfortably in the hand, and can be guided by the user in, a reliably controllable manner.

The particular maneuvering reliability is achieved by virtue of the fact that the pistol-like base housing adjoining the handle is elongated toward the rear so that in the operating position, it is supported on the user's forearm.

Since the arms of the U-shaped frame are longer than the jigsaw blade by a multiple of its length, in particular twice as long as it, relatively large work pieces can be machined all the way to their centers with the jigsaw, i.e. in a board-like work piece, the maximal cutting depth from its edge is relatively deep at approx. 270 mm.

Since the handle supports the switch button of the on/off switch of the motor at the front, this switch button is especially easy to access, particularly with the index finger, wherein the switch button is surrounded by projections affixed to the housing and it is thus more difficult to unintentionally actuate.

Since the base housing on the lower arm of the frame contains the motor and drive means for moving the jigsaw blade back and forth and since an end housing on the upper arm of the frame contains the clamping and drive means of the jigsaw blade, the moving parts are protected in a compact, dustproof manner against being damaged from the outside, while at the same time, the user is protected from being injured by the moving parts of the power jigsaw, wherein because of the clamping means for detachably securing the saw blade, the parallelogram-like transmission on the upper leaf spring can be brought from above into the released or clamping position in a convenient and controlled manner.

Since the power jigsaw has a flat support surface for supporting a work piece, which surface is disposed on top of the jigsaw's base housing, is structured with grooves, and is flush with the lower arm, the jigsaw can be guided in relation to the work piece in a particularly controlled and vibration-free manner so that saw cuts can be executed with virtually the same accuracy as a straightedge or compass.

Since the base housing of the power jigsaw can be detachably coupled, particularly in detent fashion, to a sawing table, which can be fastened to a workbench for example, wherein the handle protrudes downward beyond the sawing table in an easily accessible manner, the jigsaw and the sawing table attached to it can be used together as a hand tool that can be positioned in a particularly precise manner or can be used as a stationary device when the sawing table is flange-mounted to a workbench.

Since the power jigsaw has a work piece depressor that can be moved parallel to the jigsaw blade and simultaneously functions as a finger deflector, the work piece to be machined can be fixed in relation to the power jigsaw in a manner that can be controlled particularly well so that precise saw cuts can be executed.

Since the arms of the U-shaped frame have flat, free ends and each of these free ends supports a leaf spring that fully contacts it, these leaf springs are connected to the frame in a positionally secure and rigid manner and can be aligned in relation to one another in a precisely parallel and flush manner so that a vibration-free guidance of the saw blade is assured.

Since the leaf springs have a central fork slot on their free ends, and a clamping end of the jigsaw blade can be detachably suspended in each of these fork slots, an easy-to-produce, positively engaging clamped connection of the jigsaw blade is produced without tools, which connection is rugged and more secure than the previously known clamped connections of jigsaw blades, e.g. by means of wing nuts.

Since the upper leaf spring is bent into a U-shape and with its lower leg, is fastened, in particular riveted, to the free end of the arm of the U-shaped profile so that at least one of the legs points outward in the same direction as the free arm, wherein the curved part and the upper U-leg can be freely pivoted, this produces—in a particularly inexpensive manner—an elastically pre-stressed rocker, which is for a parallelogram-like transmission and whose counterpart rocker is constituted by the leaf spring fastened to the lower arm, for which the saw blade acts as the coupling, and in addition to the up-and-down motion, this transmission imparts a reciprocating stroke to the saw blade.

Due to its geometry, the upper leaf spring produces both the initial tension and the upward stroke (idle stoke) of the jigsaw blade, while the lower leaf spring, together with the jigsaw blade and the upper leaf spring, is pulled downward by the motor during the cutting stroke. As a result, the upper leaf spring is put under tension for the idle stroke.

Since the U-shaped frame is comprised of metal, in particular a tube with a circular or elliptical cross section, and the base housing and end housing are comprised of plastic, in particular of two housing shell halves that can be assembled, the power jigsaw is lightweight, handy, and rugged, wherein the saw blade is guided in a precise, play-free manner.

Since the motor is a direct current motor with a separate motor housing, which contains a rotor with a motor shaft, its bearings, and a stator comprised of permanent magnets, which is preceded by an electronic rectifier in order to be driven by mains voltage, the base housing of the power jigsaw can be manufactured with coarse tolerances, while the quality, operating precision, and service life of the power jigsaw remain high nevertheless.

Since the motor can be elastically supported in the housing by means of rubber rings, the motor vibrations are damped and are prevented from being transmitted to the saw blade and to the entire power jigsaw so that it can execute particularly low-vibration, precise, and straight sawing cuts.

Since a leaf spring supported by the lower arm, with its free end, serves as a support for the saw blade, which support can pivot up and down and guides this saw blade in a pivotable fashion, wherein the saw blade clamping point on the leaf spring is spaced apart from the coupling point of the leaf spring and the connecting rod, a coarsely toleranced and nevertheless precisely functioning motion transmission system from the drive motor to the jigsaw blade is produced so that the movement reversal of the saw blade is damped and contributes to the low-vibration operation of the power jigsaw. The connecting rod is only subjected to tension and can consequently be dimensioned as lightweight and can be manufactured out of wire—with a helical connecting rod eye.

Since a crankshaft is supported in the housing and supports a crank pin at its free end, which can be coupled to the lower leaf spring by means of engaging in the connecting rod eye of a connecting rod, a simple, rugged, and precise drive system is produced for the jigsaw blade.

Since the connecting rod is supported in rotary fashion on the crank pin by means of a connecting rod, in particular via a needle bearing, the friction losses during motion transmission are low.

Since the upper arm, on its free end, has a leaf spring, in particular in an end housing, which leaf spring functions as an upper support for securing the other end of the jigsaw blade, the upper and lower leaf springs, together with the jigsaw blade, constitute a parallelogram-like transmission (four-bar), in which the leaf springs function as rockers and the jigsaw blade functions as a coupling. This guidance and movement system of the jigsaw blade is simple and rugged and in addition to the longitudinal motion, gives the jigsaw blade a slight oscillating, reciprocating stroke-like lateral motion in the advancing direction.

Since the lower leaf spring, on its free end, has a downwardly curved loop, particularly produced by stamping, which constitutes an eyelet for engaging the connecting rod, in particular with the connecting rod's end that is embodied as a hook and is disposed opposite from the connecting rod eye, the lower leaf spring is particularly easy to couple with the motor.

Since the leaf springs, on their free ends, each have a channel extending lateral to the slot, in which a clamping end of the saw blade embodied as a nipple can be supported, in particular with its sharp edge, in an automatically centered fashion that constitutes a pivoting joint, the jigsaw blade is subjected only to longitudinal forces when driven and is not subjected to bending. Therefore the service life of the jigsaw blade is considerably better than in conventional manual jigsaws.

Since the base housing is embodied like a pistol from which the handle protrudes laterally at an oblique angle toward the rear, and in its angled transition into the base housing, at its rear contour, forms a curved and angled throat, which in the operating position, fits into the user's hand and is supported there both horizontally and vertically, wherein the lower arm of the U-shaped frame emerges from the rear of the housing, the jigsaw is built into the hand, so to speak, and can be guided in a particularly reliable and controllable fashion.

Since the jigsaw blade has a thickened part, in particular a nipple, at each of its two clamping ends, with which it is secured in the fork slots of the leaf springs, these thickened parts are supported between the upper and lower rocker in an articulating manner, free of bending stress. This extends the service life of the jigsaw blade in comparison to those of conventional jigsaws.

BRIEF DESCRIPTION OF THE DRAWINGS

The invention will be explained in detail in an exemplary embodiment in conjunction with the accompanying drawings.

FIG. 6 is a side, rear view of the U-shaped frame with the upper and lower leaf springs, FIG. 7 shows the lower leaf spring with a jigsaw blade suspended in it.

DETAILED DESCRIPTION OF THE PREFERRED EMBODIMENT

Figure 1:
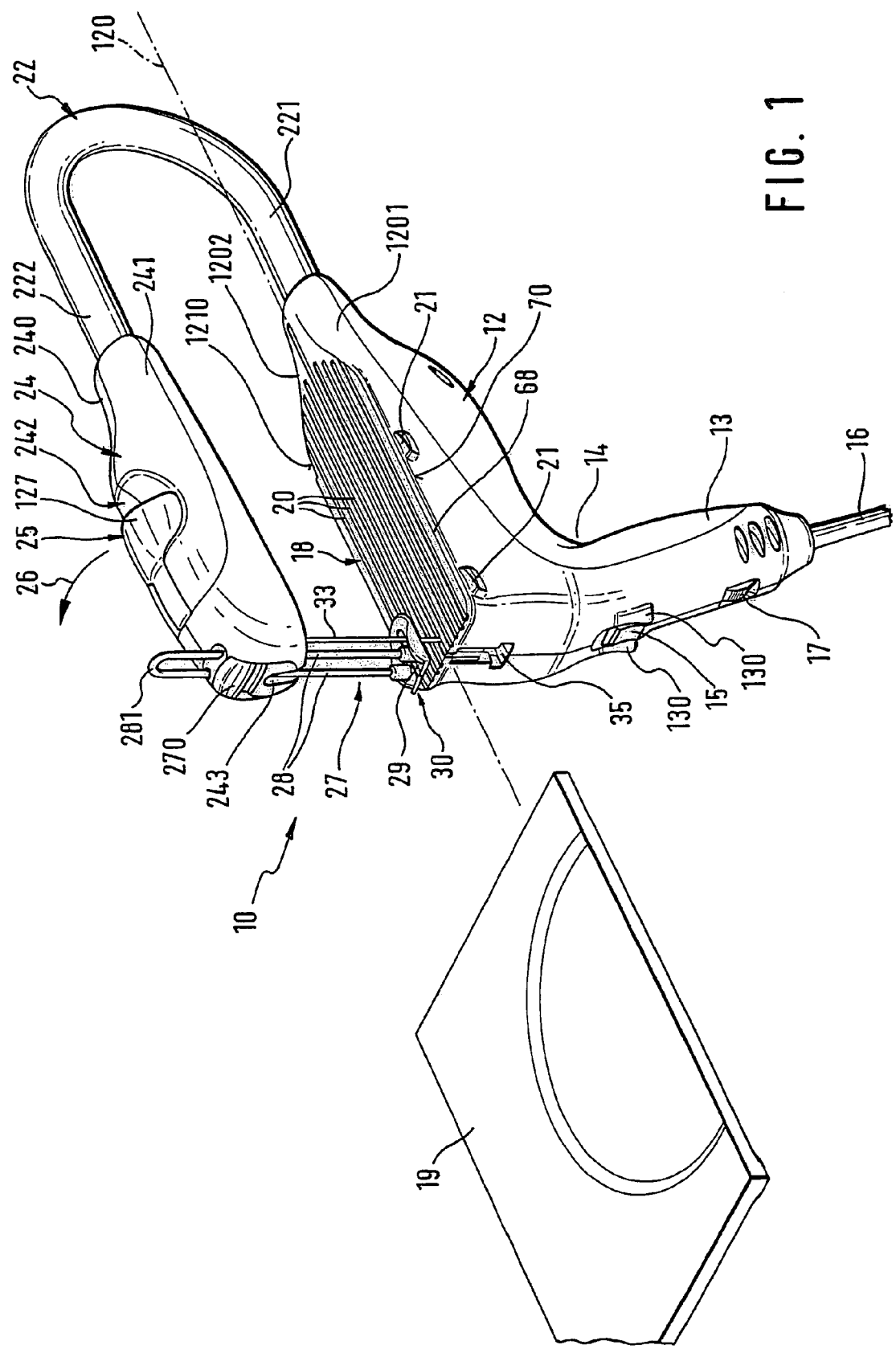
FIG. 1 is a three-dimensional front, left view of the hand guided power jigsaw according to the invention.

The power jigsaw 10 shown in FIG. 1 is comprised of a pistol-like lower base housing 12 with a handle 13 that is angled rearward and protrudes laterally downward. In the region where it emerges from the base housing 12, the rear contour of the handle 13 forms a concavely curved throat 14, which continues horizontally toward the rear as a lower outer contour of the base housing 12. The throat 14 fits into the user's hand and rests on the hand or is grasped by it, approximately in the center between the thumb and index finger. As a result, the horizontally extending rear region of the base housing 12 is supported on the back of the user's hand and on his forearm and constitutes an elongated support lever so that the jigsaw 10 can therefore be maneuvered in a particularly well-controlled manner during sawing.

The handle 13 has a switch button 15 at the front, which is adjoined closely in the lateral direction by cam-like projections 130 protruding from the handle 13 and is used for opening and closing the electrical circuit. A power cable 16 protrudes from the bottom of the handle 13 and is used to supply energy to the motor, not shown, which is disposed inside the base housing 12.

Underneath the switch button 15 on the handle 13, there is an adjusting wheel 17 of an electronic regulating system, not shown, for adjusting the speed of the motor.

The base housing 12 is comprised of two longitudinally divided half shells 1201, 1202 and at the top, has a planar support surface 18 the shape of a ship's deck, with longitudinal grooves 20, which can support a work piece 19 to be machined.

On each of the two sides, underneath a circumferential outer edge 68, the base housing 12 has two clamping clips 21 spaced apart from each other, of which only the two disposed on the left side can be seen.

Protruding rearward from the base housing 12, there is a lower arm 221 of a U-shaped frame 22, which is comprised of a curved tube and is enclosed in a sealed manner by the half shells 1201, 1202. The lower arm 221 transitions in an arc shape upward toward the front into an upper arm 222 that extends parallel to the lower arm 221. On its free end oriented toward the front, this upper arm 222 has an end housing 24 which can be affixed to the arm 222 by means of fastening screws and is comprised of two longitudinally divided housing shells 240, 241. The end housing 24 has a clamping lever 25 that can be accessed from above and whose grip 127 can be grasped from underneath by a user's finger by means of a depression-like or notch-like indentation 242 and can be pivoted upward to open in the direction of the actuation arrow 26.

On its rounded front end, the end housing 24 has a work piece depressor 27 which is comprised of two round sliding bars 28, which are supported so that they can be moved in the end housing 24 in relation to the lower housing 12 and can be locked in place. The two sliding bars 28 protrude up from the end housing 24 and are connected to each other there by means of a U-shaped curve 281. On their lower free ends oriented toward the support surface 18, the sliding bars 28 support a foot-like stop 30. This stop 30 extends back parallel to the support surface 18 in the shape of a horseshoe and has a slot 29 that opens toward the front. A jigsaw blade 33 is guided laterally and from the rear in this slot 29 and is protected from excessive deflection directed laterally or toward the rear.

After its push button 270 protruding from the front of the end housing is depressed, the work piece depressor 27 can be slid upward out of its locked position.

The jigsaw blade 33 has two clamping ends which each have a plastic nipple, not shown, which increase the diameter of the saw blade 33 considerably at its clamping ends so they can be suspended in fork-like supports 56, 57 (FIGS. 6, 7) and can therefore be clamped in place.

In its front region, beneath the push button 270, the end housing 24 has a slot-like mounting window 243 through which the clamping end of the saw blade 33, which is embodied as a nipple, can be suspended in its upper support 56. Corresponding to this, the base housing 12 has a frontal mounting slot 35 through which the lower clamping end of the jigsaw blade 33, in the form of a second nipple 34, can be suspended.

Figure 2:
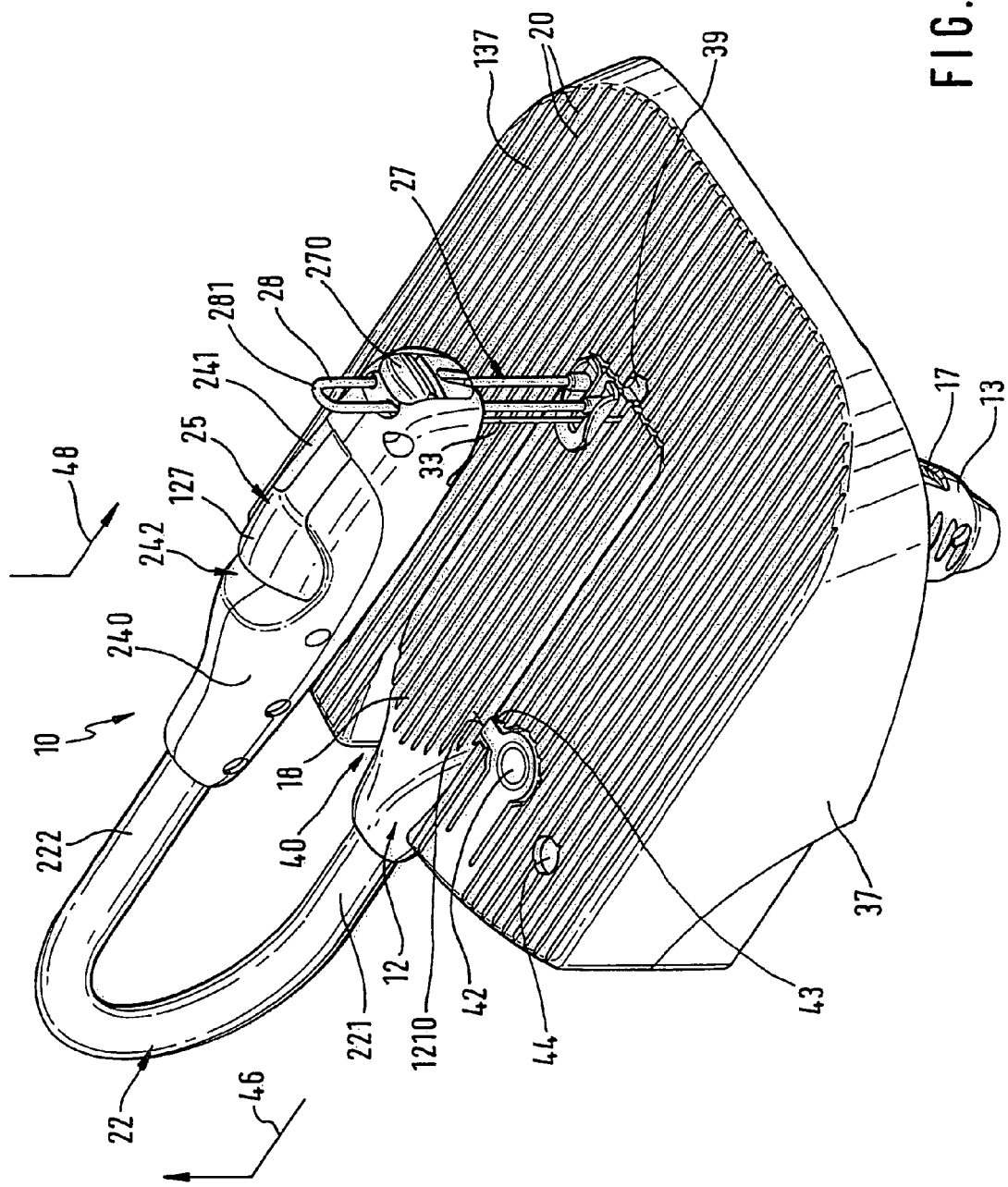
FIG. 2 is a front, right view of the power jigsaw according to FIG. 1, connected in detent fashion to a sawing table.
Figure 3:
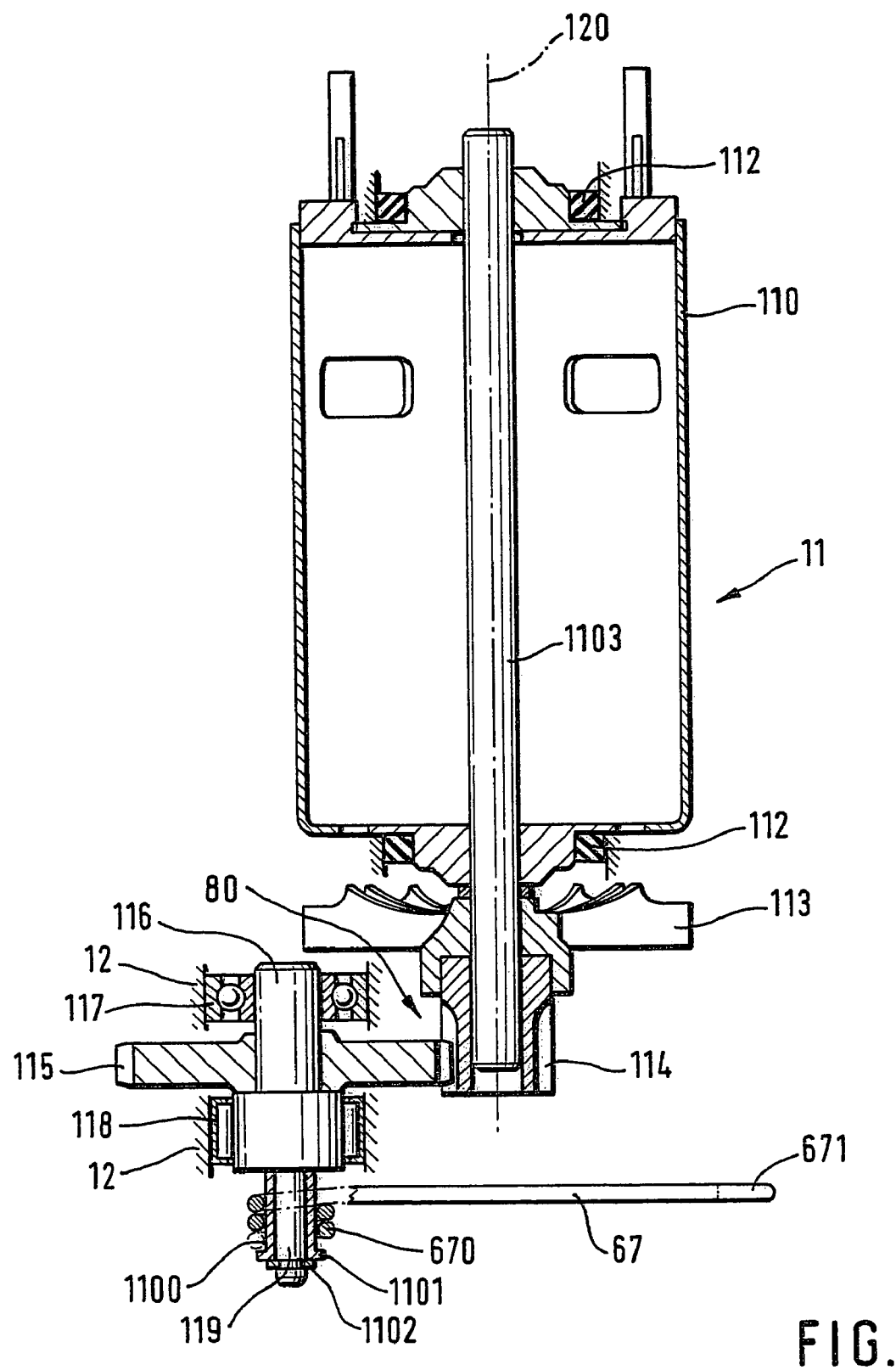
FIG. 3 is a longitudinal section through the motor with the crank mechanism and connecting rod.

FIG. 2 shows the power jigsaw 10 from the top right, coupled to a sawing table 37, whose upper, planar support surface 137 transitions in a flush manner into the support surface 18 of the base housing 12, wherein the grooves 20 of the support surfaces 137, 18 merge uniformly with one another.

At the front, the sawing table 37 has a downwardly protruding suction fitting, not shown, which at the top, in the vicinity of the support surface 137, opens out into a suction opening 39 through which saw cuttings produced during sawing can be aspirated when a suction hose of a vacuum cleaner or the like is attached to the suction fitting.

In the center of its rear region, the sawing table 37 has a recess 40 that has a U-shaped outline, extends into the support surface 137, and continues toward the bottom, which recess corresponds to the outer contour and the outer edge 68 of the support surface 18 of the base housing 12. At the top, on opposite sides, the recess 40 has longitudinal guides, not shown, which make it possible for the base housing 12 of the power jigsaw 10 to be snapped into the sawing table 37 in bayonet locking fashion and to be secured there in a play-free manner.

A locking button 42 constitutes a detent stop 43, which engages in a corresponding recess 1210 of the base housing 12 close to the support surface 18 and detachably secures the base housing 12 and therefore the power jigsaw 10 in relation to the sawing table 37.

The support surface 137 of the sawing table 37 is perforated at right angles leading toward the bottom by screw holes 44 that are uniformly spaced in relation to the outside, through which screws can be slid and by means of which the sawing table 37 can be screwed to a stationary support, for example a workbench or the like. In addition, on its outer edge toward the rear, the sawing table 37 has clamp openings, not shown, for the insertion of a clamping jaw of a screw clamp, not shown, which can be used to fasten it to a stationary support.

The handle 13 protrudes underneath the sawing table 37 so that the power jigsaw 10, together with the sawing table 37 secured to it, can be used as a hand tool. As a result, the power jigsaw 10 can be aligned particularly easily in relation to work pieces so that they are positioned at right angles to the saw blade 33 and to the support surface 18, 137.

The power jigsaw 10 according to FIG. 1 is driven by a mains-powered direct current motor, the motor 11. Its mains voltage is rectified by means of an electronic device, not shown, which is embodied as a full wave rectifier. The internal power consumption of the motor is approx. 70 Watt, the idling speed is approx. 3000 rpm.

The motor 11 has a stator, which is not constituted by conductors with current flowing through them, but by a permanent magnet. As a result, the dimensions and mass of the motor are kept low.

The armature bearing of the motor is not shown and is integrated into the motor housing 110 so that bearings for the motor shaft 1103 in the base housing 12 are no longer necessary.

The motor 11 can be inserted into one of the housing shells 121, 122 of the base housing 12 as a complete component and is affixed by rubber rings 112 between the half shells 121, 122 of the base housing 12. The motor shaft 1103 protruding from the motor housing 110 supports a fan 113 and a motor pinion 114. The rubber rings 112 constitute bearing points 111 between the half shells 121, 122 of the base housing 12, which damp the vibrations of the motor and of the transmission on the base housing 12.

Between the half shells 121, 122 of the base housing 12, a crankshaft 116 is supported in rotary fashion at two bearing points spaced apart from each other, in a ball bearing 117 and a needle bearing 118. A transmission pinion 115 that encompasses the crankshaft 116 in a rotationally fixed manner meshes with the motor pinion 114 and thereby transmits the rotation of the motor shaft 1103 to the crankshaft 116.

On its free end remote from the motor 11, the crankshaft 116 has a crank pin 119 on which a connecting rod 67 comprised of round wire is supported in rotary needle bearing fashion on the connecting rod bearing 1100 by means of its connecting rod eye 670, which is comprised of helically twisted round wire, in particular spring steel wire. The connecting rod 67 is axially secured in relation to the crank pin 119 by means of a stop disk 1101 and a clamping ring 1102. The end of the connecting rod 67 remote from the connecting rod eye 670 is embodied as a hook 671. The hook 671 engages positively in an eyelet 65 constituted by a stamped loop 64 at the free end of the lower leaf spring 51 and is supported there in an articulating fashion (FIG. 4).

Figure 4:
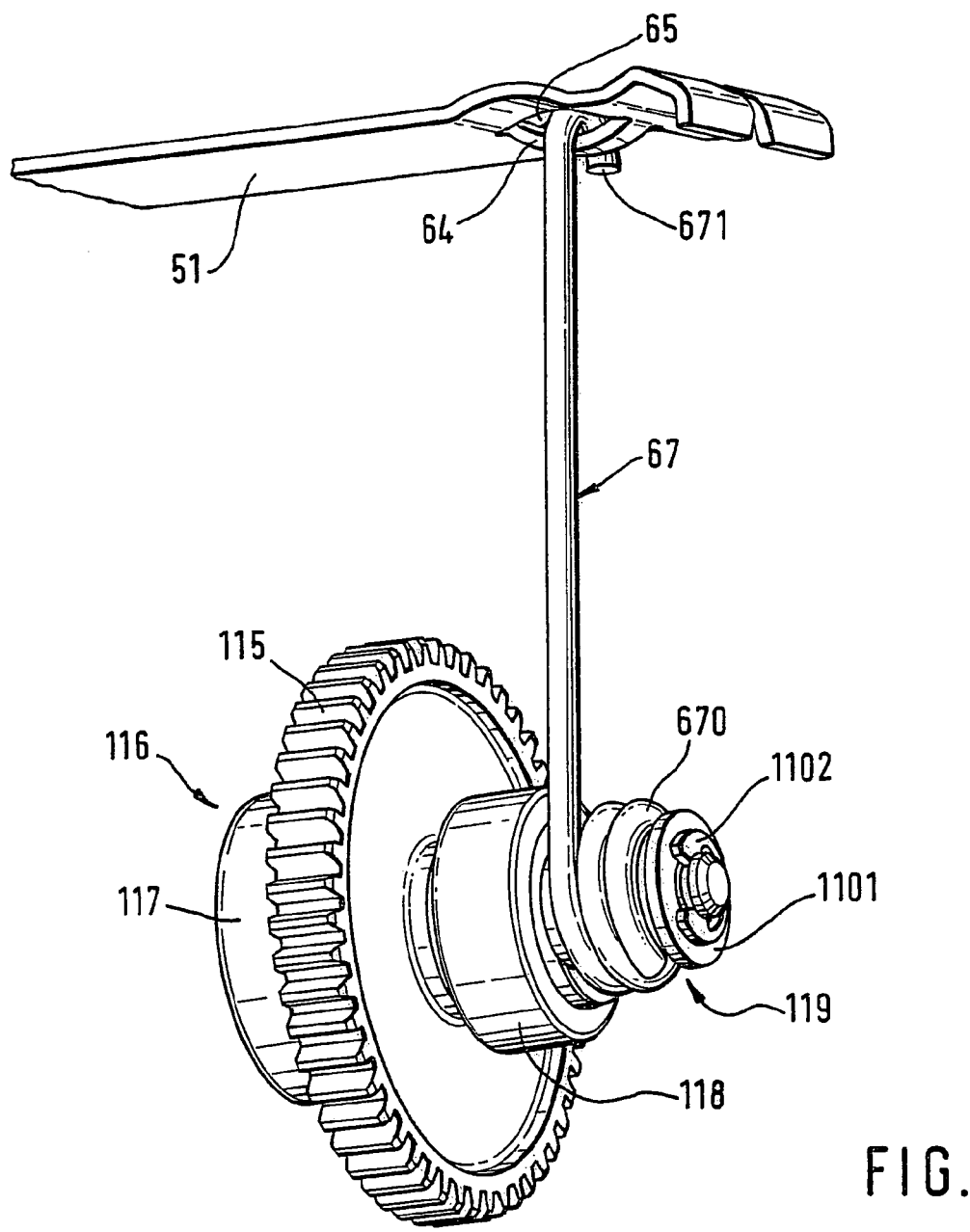
FIG. 4 is an enlarged three-dimensional depiction of the output gear with the crankshaft, connecting rod, and lower leaf spring.
Figure 5:
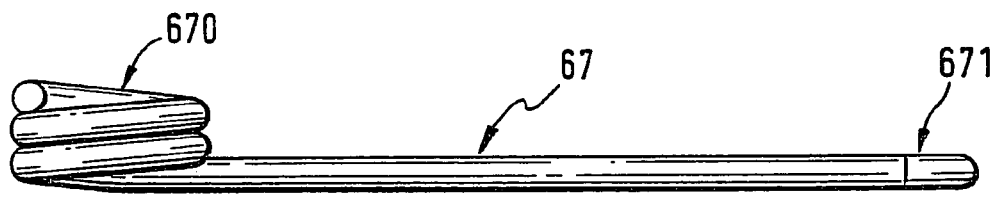
FIG. 5 shows a detail of the connecting rod.

FIG. 4 is a three-dimensional depiction of the crankshaft 116, with the transmission pinion 115 and the bearings 117, 118; as well as the crank pin 119 and the securing means mentioned above, without making further mention of them here. The transmission pinion 115 on the crankshaft 116 is comprised of plastic, insulates the transmission from the motor electrically and mechanically, and produces little noise.

FIG. 6 shows the embodiment of the U-shaped frame 22, which constitutes the rigid chassis of the power jigsaw 10 and at its ends, supports the leaf springs 50, 51 which are used as the rockers of the parallelogram-like transmission that is formed jointly by them and the jigsaw blade.

FIG. 7 shows an enlargement of the free end 57 of the lower leaf spring 51 with the fork slot 58, the channel 62, the loop 64, the arch 66, the eyelet 65, and the slot 660. It is clear that the nipple 34 of the jigsaw blade 33 is supported with its sharp edge 61 in the channel 62 in a reciprocation-like, pivoting fashion, wherein the jigsaw blade 33 passes through the fork slot 58 with its row of teeth 32 and with a square region 36 adjoining the sharp edge 61. The plastic nipple 34 is supported in a play-free fashion in the fork slot 58 because it continues on after the sharp edge 61 in the form of a square region 36 which extends well beyond the sharp edge 61 and encompasses the saw blade 33 on all sides. The square region 36 is also used to electrically insulate the saw blade 33 in relation to the motor and the transmission.

Figure 8:
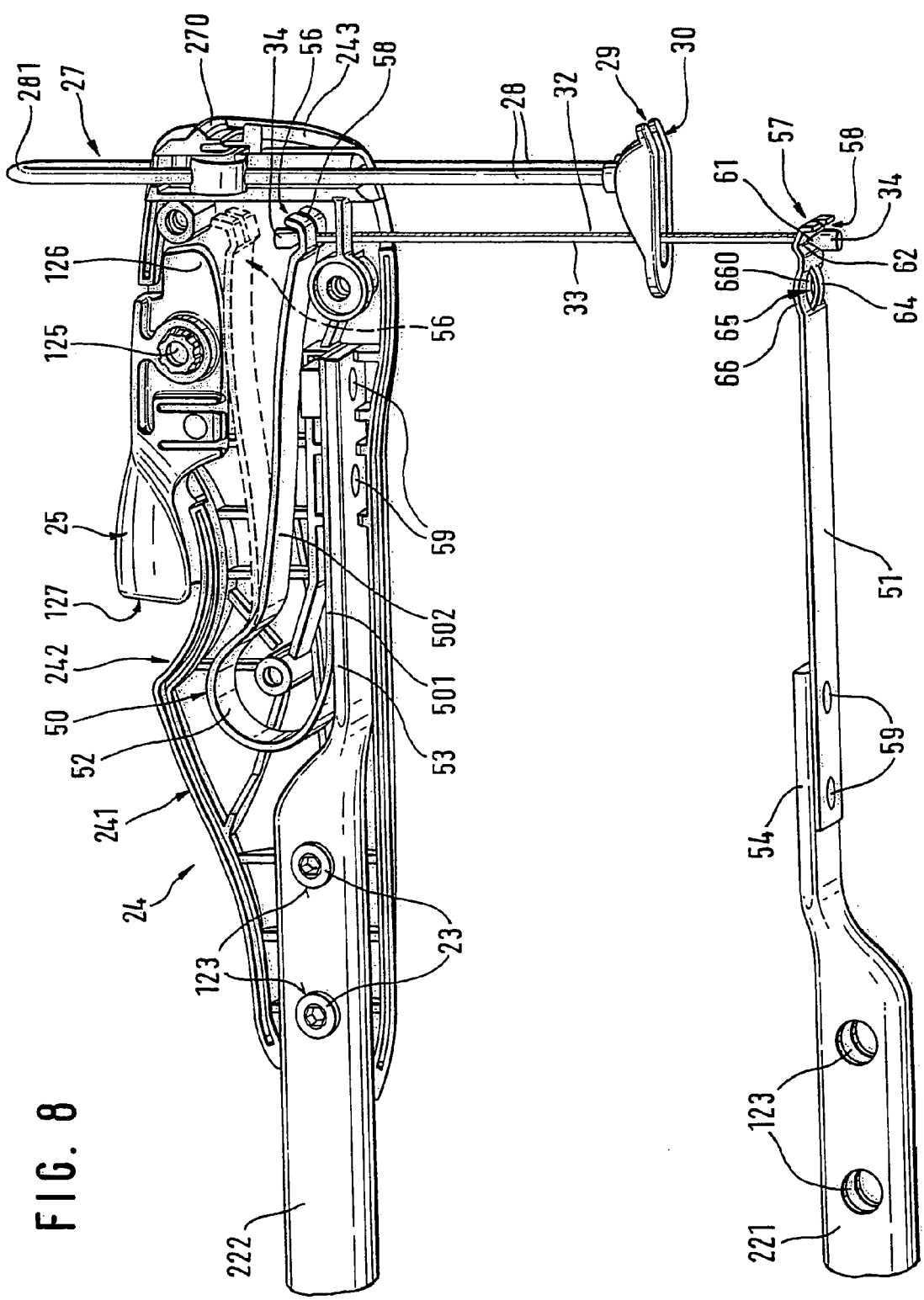
FIG. 8 shows the U-shaped frame with the end housing.

FIG. 8 shows that the U-shaped frame 22 constitutes the support of the parallelogram-like transmission, the end housing 24, and the base housing 12 with the drive mechanism and shows the front region of the lower and upper arm 221, 222 of the U-shaped frame 22 without the base housing 12. It depicts the left half shell of the end housing 24 and the clamping mechanism for releasing or fastening the jigsaw blade 33.

On its front end, the lower arm 221 has a horizontal flattening 54 which has a flat leaf spring 51 affixed to it, in particular riveted, at fastening points 59. On its free end 57 that serves as a support for the clamping end of the saw blade, the leaf spring 51 has a central fork slot 58 that allows the saw blade 33 to pass through and secures its nipple 34.

The free end 57 of the lower leaf spring 51 is angled downward at right angles at the extreme end and adjacent to this toward the rear, is angled upward like a roof so that a channel 62 is formed in the transverse direction on the underside of the roof-like angle and the jigsaw blade 33 is supported in an articulating, pivotable fashion with a sharp edge 61 of the nipple 34 in this channel 62. After the roof-like region, the free end 57 of the lower leaf spring 51 continues back in a short, planar region, which is adjoined by an upward arch 66, with a central longitudinal slot 660, which is constituted by a downward-curved loop 64 produced by means of stamping or embossing. The arch 66 and the loop 64 jointly form an oval eyelet 65 for the suspension of the connecting rod 67, which converts the rotary motion of the motor 11 into an up-and-down motion of the lower leaf spring 51 and therefore the jigsaw blade 33.

The left shell 241 of the end housing 24 is fastened to the upper arm 222 of the frame 22 by means of fastening screws 23. Like the free end of the upper arm 221, the free end of the upper arm 222 also constitutes a horizontal flattening 53, whose top side is riveted to the upper leaf spring 50 at fastening points 59.

The upper leaf spring 50 extends as a U that opens toward the right, with its legs 501, 502 toward the outside like the free end 53 of the upper arm 222, wherein the lower, short leg 501 is fastened to the arm 222. The legs 501, 502 are connected to each other by means of a curved part 52.

The free end 56 of the upper, longer leg 502 of the leaf spring 50 is angled upward at right angles at the free end and adjacent to that, is shaped like a downward-pointing V—in a mirror image to the outer end 57 of the lower leaf spring 51—and likewise forms a channel 62 which also has a central fork slot 58 passing through its middle so that the saw blade 33 is supported in an articulating fashion, with its other nipple 34 in the fork slot 58 and in the channel 62 of the V-shaped region.

Close to their free ends, the arms 221, 222 have through openings 123 which extend transversely to the plane spanned by the frame 22 and permit the passage of fastening screws 23 for assembling the base housing 12 and the end housing 24, in particular their half shells.

The upper leg 502 of the upper leaf spring 50 is associated with a clamping lever 25 embodied as a two-armed lever, which can be pivoted upward with its grip 127 around a pivot shaft 125 in the end housing 24 so that its cam 126 travels downward and thereby carries the upper leg 502 of the leaf spring 50 along with it toward the lower arm 221. For the sake of better engagement of the user's finger, the grip 127 of the clamping lever 25 is a tubular, hollow body that is open toward the rear into which the user, guided by an indentation 242 in the outer contour of the end housing 24, can easily insert a finger and pivot the lever upward.

The work piece depressor 27 is disposed in the front region of the end housing 24. Underneath the end housing 24, the sliding bars 28 of this depressor 27 support the foot-like stop 30, which is embodied in the shape of a horseshoe, with a central slot 29 for encompassing the saw blade 33 at the sides and the rear.

The pushbutton 270 is also shown, which, when depressed, can release the locking connection of the depressor 27 and the sliding bars 28 in the upward direction. As a result, the user can easily adjust the depressor 27 manually by raising or lowering the curve 281.

The clamping lever 25 is disposed in its clamping position, wherein it rests in the concave recess 242 and thereby extends inside the outer contour of the end housing 24.

The upper leaf spring 50 is shown with only dashed lines in the upper dead point position, i.e. in the clamping position and is shown with solid lines in the release position for changing the saw blade 33.

The dimensioning of the upper leaf spring 50 is selected so that it produces the upward stroke (idle stroke) of the parallelogram-like transmission after the connecting rod 67, which is only subjected to tensile force, has moved the parallelogram-like transmission, i.e. the two leaf springs 50, 51 together with the jigsaw blade 33, down toward the bottom dead point during the cutting stroke.

Figure 9:
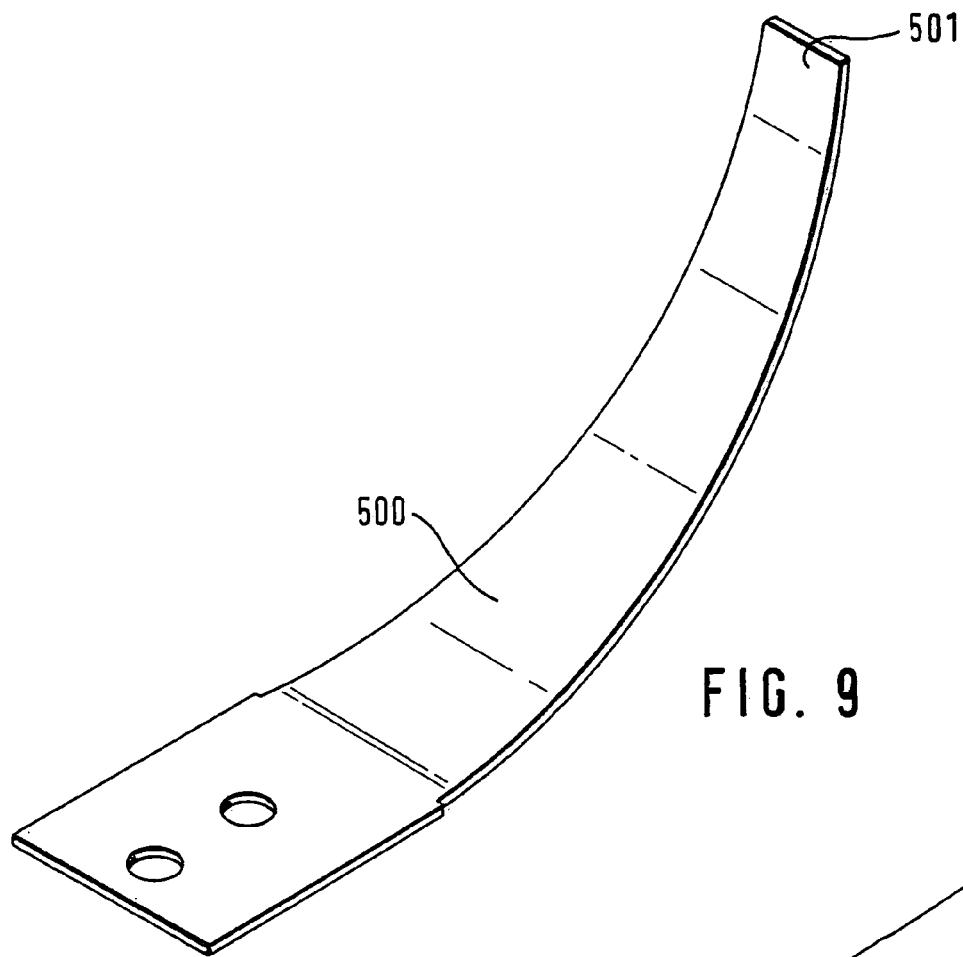
FIGS. 9 & 10 show the upper leaf spring in a trapezoidal exemplary embodiment.
Figure 10:
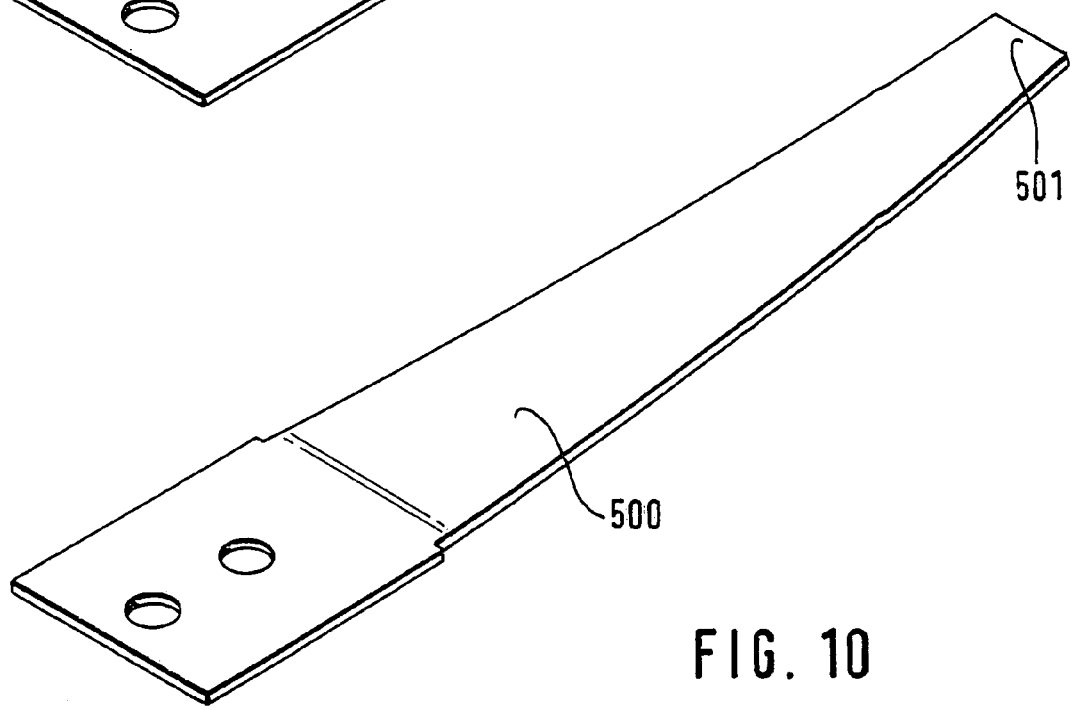

As a variant to the U-shaped upper leaf spring 50, FIGS. 9 and 10 show a flat, trapezoidal leaf spring 500, which has the same characteristic spring curve as the spring 50, but is easier to manufacture and permits an easier riveting to the upper arm 222 of the frame 22.

The trapezoidal form of the leaf spring 500 assures a more uniform distribution of the bending stress during deflection of the spring end during the cutting stroke of the saw blade 33 than with the U-shaped leaf spring 50.

In FIG. 9, the leaf spring 500 is released, with the outer end 501 arched upward in the upper dead point of the cutting stroke and in FIG. 10, it is shown bent downward, i.e. straight in the stressed state of the lower dead point—before the upward stroke of the saw blade 33.

Figure 11:
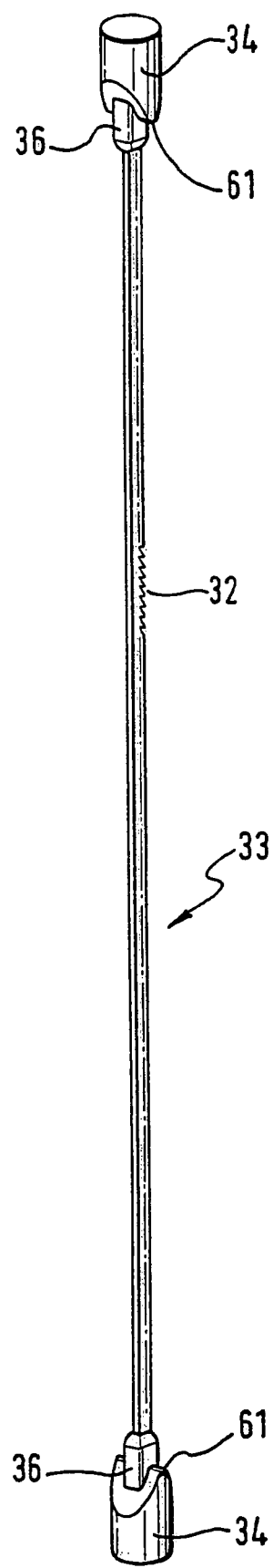
FIG. 11 shows a detail of the jigsaw blade.

FIG. 11 shows a detail of the jigsaw blade 33 with the clamping ends which are embodied as nipples 34, their roof slopes, sharp edges 61, and square regions 36.

Figure 12:
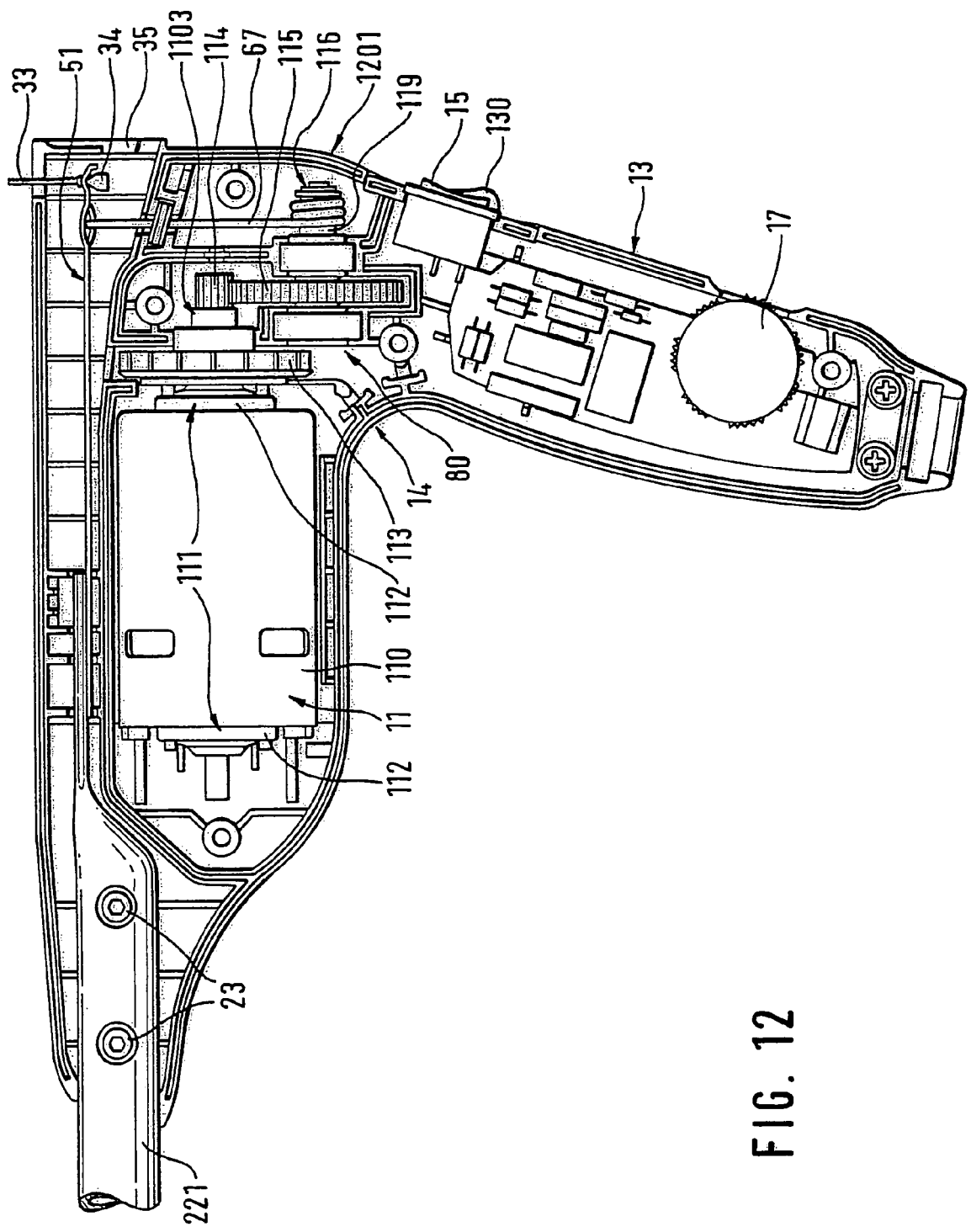
FIG. 12 shows the left half-shell with the motor and transmission installed.

FIG. 12 shows the left half shell 1202 of the base housing 12 with the motor 11 and transmission 80 installed, wherein the motor housing 110 has rubber rings 112 that constitute elastic support points 111 to contain the motor 11 in an oscillation-damped manner. A motor shaft 1103 supports a fan 113 and an axially adjacent pinion 114 which meshes with a counterpart pinion 115. The counterpart pinion 115 is non-rotatably supported on a crankshaft 116 which on its free end, has a crank pin 119 for driving the connecting rod 67.

The invention claimed is:

1. A hand-guided power jigsaw (10) with a jigsaw blade (33) which can be detachably clamped between the ends of two essentially parallel arms (221, 222) comprised of a U-shaped frame (22) in the form of a tube, and which can be driven in a reciprocating manner by a motor (11) integrated into the jigsaw (10), wherein a protruding handle (13), with a switch button (15) of an on/off switch is disposed on one of the arms (221, 22), wherein a lower one of said arms (221) carries the motor (11) and a transmission mechanism (114, 115, 116, 119, 67) for moving the saw blade (33) back and forth in a base housing (12), wherein a crankshaft (116) coupled to the motor (11) by means of a connecting rod (67) engages an elastic support (51, 57) in order to secure the jigsaw blade (33) in a detachable fashion, wherein the motor (11) is a direct current motor having a separate motor housing (110) that encapsulates a rotor with a motor shaft (1103), its bearings, and a stator comprised of permanent magnets, and which can be connected to a main voltage source via an electronic rectifier.

2. The jigsaw according to claim 1, wherein the motor (11) can be elastically supported in the base housing (12) by means of rubber rings (112).

3. The jigsaw according to claim 1, wherein the crankshaft (116) is supported in the base housing (12) and on a free end thereof, supports a crank pin (119) which can be coupled in a positively engaging manner to the connecting rod (67).

4. The jigsaw according to claim 3, wherein the connecting rod (67) is supported in rotary fashion on the crank pin (119) with a connecting rod eye (680) by means of a needle bearing (1100).

5. The jigsaw according to claim 1, wherein with its free end (57), a lower leaf spring (51) supported by the lower arm (221) serves as a support (57) for the saw blade (33) and this support (57) can be pivoted up and down and guides the saw blade (33) in a parallelogram-like fashion, wherein the connecting rod (67) coupled to the lower leaf spring (51) is only subjected to tension.

6. The jigsaw according to claim 5, wherein on its free end in an end housing (24), an upper one of said arms (222) supports an upper leaf spring (50), which serves as an upper support (56) for securing one end (34) of the jigsaw blade (33), wherein a parallelogram-like transmission is formed, with the saw blade (33) acting as a coupling and with the supports (56, 57) acting as rockers.

7. The jigsaw according to claim 6, wherein the end housing (24) has clamping means (25) for detachably securing the saw blade (33).

8. The jigsaw according to claim 6, wherein the upper leaf spring (50) is bent into a U-shape and has two legs (501, 502), one of which is fastened by riveting to the free end (53) of the upper arm (222), wherein at least one of the legs (501, 502) points outward in the same direction as the upper arm (222).

9. The jigsaw according to claim 6, wherein the ends (56, 57) of the leaf springs (50, 51) that serve as supports have a slot (58) in the center, in which a clamping end (34) of the jigsaw blade (33) can be detachably suspended, wherein the jigsaw blade (33) can be guided up and down in a parallelogram-like fashion on fork ends (56, 57) of the leaf springs (50, 51).

10. The jigsaw according to claim 9, wherein at their free ends, the leaf springs (50, 51) each have a channel (61) extending lateral to the slot (58) and the clamping end of the saw blade (33) embodied as a nipple (34) can be supported with a prismatic sharp edge (61), in an automatically centered way in this channel (61), forming an articulating joint.

11. The jigsaw according to claim 10, wherein on its free end (57), the lower leaf spring (51) has a loop (64) that curves downward and is produced by stamping, which constitutes an eyelet (65) for the engagement of the connecting rod (67) with an end embodied as a hook (671).

12. The jigsaw according to claim 6, wherein the jigsaw blade (33) has two clamping ends which are provided with thickened parts in the form of nipples (34) which are secured in a fork slot (58) on the supports (56, 57) of the leaf springs (50, 51).

13. The jigsaw according to claim 1, wherein the base housing (12) is embodied in the form of a pistol and has a handle (13) that protrudes down and back at an oblique angle, whose rear contour forms a curved and angled throat (14), which in the operating position, fits vertically into a user's hand and is grasped there both horizontally and vertically, wherein the lower arm (221) of the U-shaped frame (22) emerges from the rear of the housing (12), curves upward in an arc-shape, and transitions toward the front into an upper one of said arms (222).

14. The jigsaw according to claim 13, wherein base housing (12) adjoining the handle (13) extends back and serves as a forearm support.

* * * * *